Sept. 4, 1962  M. WALLSHEIN  3,052,027
ORTHODONTIC APPLIANCES
Filed Jan. 20, 1960  2 Sheets-Sheet 1

INVENTOR,
MELVIN WALLSHEIN,
BY
ATTORNEY.

Sept. 4, 1962  M. WALLSHEIN  3,052,027
ORTHODONTIC APPLIANCES
Filed Jan. 20, 1960  2 Sheets-Sheet 2
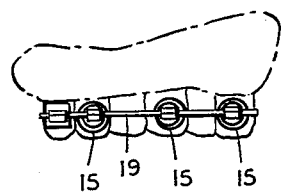
FIG.15
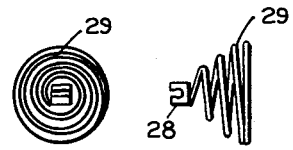
FIG.16   FIG.17
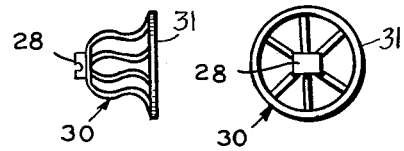
FIG.18   FIG.19
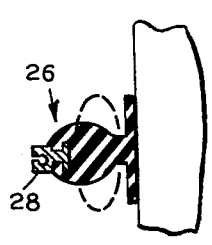
FIG.20
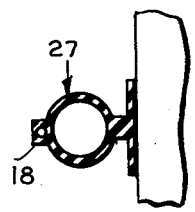
FIG.21
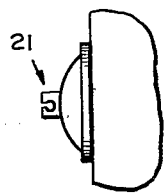
FIG.22
INVENTOR,
MELVIN WALLSHEIN,
BY 
ATTORNEY.

United States Patent Office 3,052,027
Patented Sept. 4, 1962

3,052,027
ORTHODONTIC APPLIANCES
Melvin Wallshein, 8645 Bay Parkway, Brooklyn, N.Y.
Filed Jan. 20, 1960, Ser. No. 3,628
8 Claims. (Cl. 32—14)

The present invention relates to improvements in brackets which are mounted on teeth in the practice of orthodontia.

The physical incidents occuring in the process of aligning teeth, is very ably set forth in the introductory paragraphs of Patent No. 2,230,315. Essentially, the forces applied to the teeth out of line, must be gentle so as not to injure the sensitive membranes and associated capillaries.

It is therefore an object of this invention to provide a novel and improved orthodontic bracket which avoids shock impact and allows the forces brought into play by the stressed arch wire supported thereon, to act on the misalined teeth in resilient fashion.

Another object thereof is to provide an orthodontic bracket of novel and improved construction which can be made to impart gentle forces in any desired direction; such forces being adapted to be harnessed to accomplish teeth straightening operations in gentle manner.

Another object thereof is to provide a novel and improved orthodontic bracket which can be mounted directly onto a tooth, or if desired it may be on the usual ring bands encircling individual teeth.

A further object of this invention is to provide novel and improved orthodontic brackets having the attributes mentioned, which are simple and reasonably cheap to manufacture, easy to manipulate, convenient in use and efficient in carrying out the purposes for which they are designed.

Other objects and advantages will become apparent as this disclosure proceeds.

For the practice of this invention, my new appliance consists of a deformable, resilient element of flexible rubber, metal, plastic or other suitable material which can be stressed in tension, compression and/or torsion and preferably in all these manners. This element may be cemented or in other suitable manner mounted directly onto a tooth or onto a band tightly fitting around a tooth, and it carries a suitable horizontal channel to support an arch wire. This deformable resilient element always acts as a shock absorber regardless of the manner in which it is employed, so that forces acting against the teeth are gently applied. Arrangement may be made where said deformable element is distorted in many directions to create forces to do corrective work. Said element may take on many forms. I have shown it in the form of a hollow dome with a rim flange for attachment by cement or otherwise, and in solid shape integral with an attaching disc and also in spiral and crown forms, as illustrative examples embodying the teachings of this invention.

In the accompanying drawings forming part of this specification, similar characters of reference indicate corresponding parts in all the views.

FIG. 1 is a front view of an orthodontic bracket appliance embodying the teachings of this invention. It is here shown as being a hollow dome shape having a flange around its mouth rim, which flange is cemented directly onto the buccal face of a tooth. At the crest of dome, there is a horizontal channel to support an arch wire. This channel is here integral with said dome, and is normally in closed condition. Said channel here, is really a split tube.

FIG. 15 is a side view of the upper set of teeth of a patient, fitted with bracket appliances as taught herein with an arch wire supported by said appliances.

FIG. 16 is a front view of a modified embodiment of spiral form.

FIG. 17 is a side view of FIG. 16.

FIG. 18 is a side view of another modification. Here the appliance is of crown form in its deformable body portion.

FIG. 19 is a side view of FIG. 18.

FIGS. 20 and 21 are sections like FIG. 2 of other modified forms of the appliance of FIG. 1.

FIG. 22 is a side view like FIG. 2, of still another modified form of this appliance.

Figure 1:
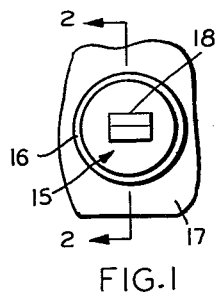
Figure 2:
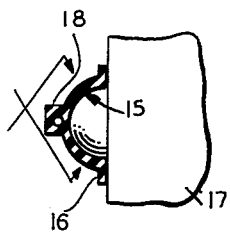
FIG. 2 is a section taken at line 2—2 in FIG. 1.
Figure 3:
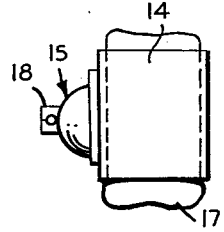
FIG. 3 is a side view of FIG. 1, but here, the bracket appliance is cemented onto a band fitting tightly on the tooth.
Figure 4:
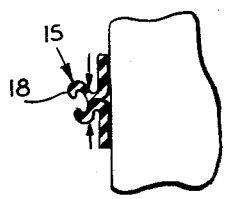
FIG. 4 is like FIG. 2, but shows the channel open to receive an arch wire which is to be placed laterally therein.
Figure 5:
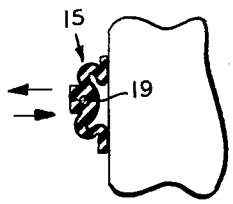
FIG. 5 is like FIG. 2, but shows the arch wire in position so that said dome is stressed in compression.
Figure 6:
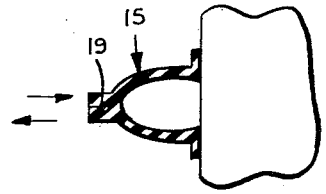
FIG. 6 is like FIG. 2, but shows in position an arch wire which causes the dome to stretch and of course, the latter is stressed in tension.
Figure 7:
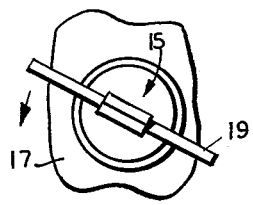
FIG. 7 is a front view like FIG. 1, but here the dome is held stressed in torsion by the arch wire.
Figure 8:
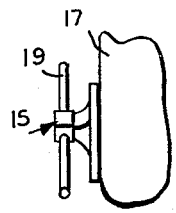
FIG. 8 is a side view of FIG. 7.

In the drawings, the numeral 15 designates generally a dome-shaped hollow rubber element having an outward flange 16 to cement it directly onto a tooth 17, or onto a metal band 14 fitted tightly about a tooth, and also having a bracket 18 which may be integral therewith, positioned horizontally to support an arch wire 19. The property of this rubber material should allow compression of the dome as shown in FIG. 5, expansion, meaning stretching as shown in FIG. 6 and torsion as shown in FIGS. 7 and 8. The stress in each instance shall be sufficient to exert a force which is used or can be used to shift or aid in the shifting of a tooth which needs alignment. The manner and direction or directions in which said rubber element 15 is held in stress by the arch wire 19 or other appliance as may be used, will of course determine the direction of the force the stressed element can be used to impart. In normal condition, in the embodiments shown, the bracket 18 is centrally of the dome shape.

Figure 9:
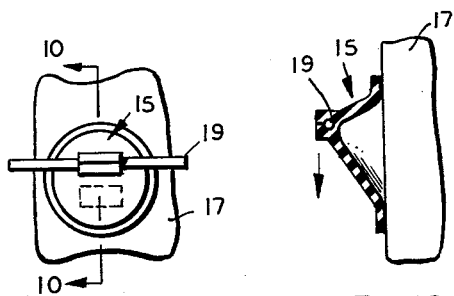
FIG. 9 is a front view like FIG. 1, but here the dome is held stressed by the arch wire so that the appliance exerts a downward lateral pull on the arch wire.
Figure 10:
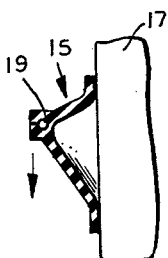
FIG. 10 is a section taken at line 10—10 in FIG. 9.

When the arch wire 19, in fixed position, is above the central horizontal plane of the element 15 and the bracket supports it as in FIG. 9, said element will be stressed so that it can impart a downward force. Without further illustration, it is readily understandable that when the arch wire, in fixed position, is below said plane and the bracket supports it, said element will be stressed so that it will impart an upward force. In FIG. 5, the element 15 imparts a force away from the tooth it is on, but such force does not play on the tooth said element is on. In FIG. 6, the element 15 imparts a pulling force on the tooth it is on, in a direction towards the bracket thereof.

Figure 11:
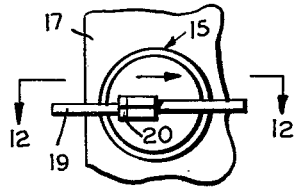
FIG. 11 is a front view like FIG. 1, but here the dome is stressed by the arch wire so that a force is brought to play along the arch wire from left to right.
Figure 13:
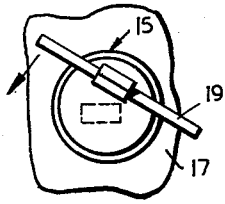
FIG. 13 is a front view like FIG. 1, but here the dome is held stressed so that the force imparted onto the arch wire is downward and also a torsional force exerted by the deformed dome to impart a counter-clockwise turning movement to said arch wire.
Figure 14:
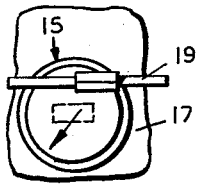
FIG. 14 is a front view like FIG. 1, but here the dome is held stressed by the arch wire so that a tilted downwardly directed force is brought to play onto said arch wire.
Figure 12:
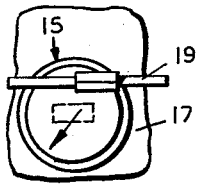
FIG. 12 is a section taken at lines 12—12 in FIG. 11.

When the arch wire 19, in fixed position, is slanted as in FIG. 7 and is mounted in the bracket with the latter centrally of the element 15, the arch wire will be subjected to a rotation in counter-clockwise direction. When the slant of the arch wire is in the opposite direction to that shown in FIG. 7, and mounted in the bracket, it is evident without further illustration that the arch wire will be subjected to clock-wise rotation. When the arch wire, in fixed position, is slanted and as in FIG. 13 is above the axis line of the rubber element 15 and the bracket is pulled up and twisted so that the arch wire can be supported therein, then the arch wire is subject to both a downward and a rotational force. When the arch wire, in fixed position, is along the bracket, mounted in it and the rubber element is held to one side along said arch wire by an element 20 fixed on said arch wire, the arch wire will be subjected to a force acting along said wire, as in FIG. 11. When the arch wire, in fixed position, is to one side of and above the bracket and mounted in said bracket by pulling the bracket to said wire, the force acting on said wire will be slanted downwardly as indicated in FIG. 14.

Where only the action of the arch wire 19 is called upon to accomplish alignment, the appliances 15 are used to support it as in FIG. 15, where the domes of the elements 15 would be merely compressed as in FIG. 5 and act as cushioning means and shock absorbers, so that the teeth are acted upon gently, gradually and without shock. The appliance may be a solid pad like 21 carrying a bracket, where it is for normal bracket use without being called upon to impart any special forces of predetermined direction. Such is shown in FIG. 22.

The deformable part of the appliance may be solid and spherical as shown at 26 in FIG. 20, or hollow and spherical as shown at 27 in FIG. 21. The bracket may be integral with any of the deformable elements herein illustrated or it may be a metal piece secured on any of the deformable components shown as for instance illustrated at 28 in FIG. 20 and may be any type bracket employable in orthodontia. Also as further examples, the deformable part may be spiral drawn to a conical helix as shown at 29 in FIGS. 16 and 17, or it may be a springy crown shape as shown at 30 in FIGS. 18 and 19, where integral ring 31 is for the mounting of the appliance by cement or otherwise.

It is evident that these appliances may be used to impart forces in any required direction and when properly harnessed to the arch wire as particular conditions may require, will act to correct alignment. In any event, these appliances act as shock absorbers which bring forces to play gently on the teeth.

This invention is capable of numerous forms and various applications without departing from the essential features herein disclosed. It is therefore intended and desired that the embodiments shown herein shall be deemed merely illustrative and not restrictive and that the patent shall cover all patentable novelty herein set forth; reference being had to the following claims rather than to the specific desecription herein to indicate the scope of this invention.

I claim:
1. In combination with an orthodontic arch wire, a stretchable, compressible, bendable and twistable element of resilient rubber-like quality, adapted to be mounted whereby it is securely carried by a tooth, and an element supporting the arch wire, mounted on said resilient element; said resilient element when mounted on a tooth being in a substantially distorted and stressed condition exerting forces in a plurality of directions so that the resilient element acting to return to normal unstressed condition will impart a plurality of forces which act to move the tooth.

2. An orthodontic appliance as defined in claim 1, wherein the resilient element is adapted to receive a cement on the portion thereof which is to be adjacent the tooth it is to be carried by whereby said resilient element is mountable by adhesion.

3. An orthodontic appliance as defined in claim 1, wherein the resilient element is substantially a dome shape having a flange at its rim.

4. An orthodontic appliance as defined in claim 1, wherein the resilient element is a pad.

5. An orthodontic appliance as defined in claim 1, wherein the resilient element includes a pad and another part integral with said pad; said other part carrying the arch-supporting element.

6. An orthodontic appliance as defined in claim 1, wherein the resilient element includes a ring and another part integral with said ring; said other part carrying the arch-supporting element.

7. An orthodontic appliance as defined in claim 6, wherein said other part is substantially a conical helix extending from said ring with its apex away from said ring; the arch-supporting element being at such apex.

8. An orthodontic appliance as defined in claim 6, wherein the other part comprises joined elements forming a crown with said ring; the arch-supporting element being at the apex of said crown shape.

References Cited in the file of this patent
UNITED STATES PATENTS

| | | |
|---|---|---|
| 561,877 | Fallon | June 9, 1896 |
| 1,405,221 | Jenkins | Jan. 31, 1922 |
| 2,368,851 | Laskin | Feb. 6, 1945 |
| 2,767,469 | Gladstone | Oct. 23, 1956 |
| 2,843,421 | Shelton | July 15, 1958 |
| 2,915,824 | Kesling | Dec. 8, 1959 |